US010200454B1

(12) United States Patent
Lewis et al.

(10) Patent No.: US 10,200,454 B1
(45) Date of Patent: *Feb. 5, 2019

(54) SELECTING CONTENT FOR CO-LOCATED DEVICES OF MULTIPLE USERS

(71) Applicant: Google LLC, Mountain View, CA (US)

(72) Inventors: Justin Lewis, Marina del Rey, CA (US); Ruxandra Georgiana Paun, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 714 days.

This patent is subject to a terminal disclaimer.

(21) Appl. No.: 14/296,344

(22) Filed: Jun. 4, 2014

(51) Int. Cl.
*H04L 29/08* (2006.01)

(52) U.S. Cl.
CPC ................... *H04L 67/10* (2013.01)

(58) Field of Classification Search
USPC ......................................................... 709/224
See application file for complete search history.

(56) References Cited

U.S. PATENT DOCUMENTS

| 8,326,221 | B2 | 12/2012 | Dorsey |
| 8,489,079 | B2 | 3/2013 | Hintermeister et al. |
| 9,219,790 | B1* | 12/2015 | Filev ........................ H04L 67/22 |
| 2005/0113115 | A1 | 5/2005 | Haberman et al. |
| 2005/0138138 | A1 | 6/2005 | Jelinek et al. |
| 2007/0288470 | A1* | 12/2007 | Kauniskangas ..... H04L 12/2809 |
| 2008/0120308 | A1* | 5/2008 | Martinez ........... G06F 17/30035 |
| 2008/0300985 | A1 | 12/2008 | Shamp et al. |
| 2012/0047011 | A1 | 2/2012 | Rippetoe et al. |
| 2012/0254246 | A1* | 10/2012 | Kerger .................. H04W 4/206 707/780 |
| 2013/0260691 | A1 | 10/2013 | Hintermeister et al. |
| 2014/0006496 | A1* | 1/2014 | Dearman ................ H04L 67/16 709/204 |
| 2014/0379477 | A1* | 12/2014 | Sheinfeld ........... G06Q 30/0251 705/14.58 |
| 2015/0128014 | A1* | 5/2015 | Monroe ................ G06F 3/0482 715/202 |

FOREIGN PATENT DOCUMENTS

EP            2169925           3/2010

* cited by examiner

*Primary Examiner* — Lance Leonard Barry
*Assistant Examiner* — Mohammad Yousuf A. Mian
(74) *Attorney, Agent, or Firm* — Fish & Richardson P.C.

(57) ABSTRACT

Methods, systems, and apparatus include computer programs encoded on a computer-readable storage medium, including a method for providing content. A set of co-located devices is identified, including at least first and second devices that are associated with different users and are currently in proximity to each other. A determination is made that a first one of the co-located devices is configured to be viewed by multiple people. Use data is gathered that is associated with current sessions associated with the different users related to their use of their respective devices including gathering first data related to the use of the first device by a first user and second data related to the use of the second device by a second different user. The first and second data are aggregated and evaluated to identify content to present on the first one of the co-located devices for presentation to both users.

20 Claims, 5 Drawing Sheets

320

Identify a set of co-located devices including at least a first device and a second device that are associated with different users and are currently in proximity to each other
322

Determine that at first one of the co-located devices is configured to be viewed by multiple people
324

Gather use data associated with current sessions associated with the different users related to their use of their respective devices including gathering first data related to the use of the first device by a first user and second data related to the use of the second device by a second different user for their current sessions
326

Aggregate the first and second data to create aggregate data related to use of both the first and second devices by their respective users
328

Evaluate the aggregate data including using the aggregate data to identify content to present on the first one of the co-located devices for presentation to both the first and the second user
330

FIG. 3B

SELECTING CONTENT FOR CO-LOCATED DEVICES OF MULTIPLE USERS

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes identifying a set of co-located devices including at least a first device and a second device that are associated with different users and are currently in proximity to each other. The method further includes determining that a first one of the co-located devices is configured to be viewed by multiple people. The method further includes gathering use data associated with current sessions associated with the different users related to their use of their respective devices including gathering first data related to the use of the first device by a first user and second data related to the use of the second device by a second different user for their current sessions. The method further includes aggregating, using one or more processors, the first and second data to create aggregate data related to use of both the first and second devices by their respective users. The method further includes evaluating the aggregate data including using the aggregate data to identify content to present on the first one of the co-located devices for presentation to both the first and the second user.

These and other implementations can each optionally include one or more of the following features. Identifying a set of co-located devices can include receiving location information for both the first and second device, evaluating the received location information to determine a relative distance between the first and second devices, and comparing the relative distance to a threshold. The method can further include receiving login information for both the first and second users from their respective devices, and evaluating the aggregate can data further include evaluating respective profiles associated with the first and second user to identify the content. Determining that a first one of the co-located devices is configured to be viewed by multiple people can include determining a screen size associated with the first one of the co-located devices and determining that the screen size is above a threshold size. Gathering use data can include gathering data for only as long as the first and second devices are co-located. The method can further include identifying filters to be associated with the aggregate data based on one or more characteristics associated with the first and second different users, and filtering content selections based on the identified filters prior to presentation on the first one of the co-located devices. The method can further include receiving, from the first one of the co-located devices, a request for content, and providing a selection for presentation on the first one of the co-located devices based on the evaluating. The method can further include storing the aggregate data for use in selecting content only as long are the first and second device are co-located. The method can further include using the aggregate data to select content for presentation on other ones of the co-located devices. The method can further include selecting a first content item based on the aggregate data for display on the first one of the co-located devices, and selecting second different content items for display on other ones of the co-located devices based at least in part on the first content item.

In general, another innovative aspect of the subject matter described in this specification can be implemented in computer program products that include a computer program product tangibly embodied in a computer-readable storage device and comprising instructions. The instructions, when executed by one or more processors, cause the processor to: identify a set of co-located devices including at least a first device and a second device that are associated with different users and are currently in proximity to each other; determine that a first one of the co-located devices is configured to be viewed by multiple people; gather use data associated with current sessions associated with the different users related to their use of their respective devices including gathering first data related to the use of the first device by a first user and second data related to the use of the second device by a second different user for their current sessions; aggregate, using one or more processors, the first and second data to create aggregate data related to use of both the first and second devices by their respective users; and evaluate the aggregate data including using the aggregate data to identify content to present on the first one of the co-located devices for presentation to both the first and the second user.

These and other implementations can each optionally include one or more of the following features. Identifying a set of co-located devices can include receiving location information for both the first and second device, evaluating the received location information to determine a relative distance between the first and second devices, and comparing the relative distance to a threshold. The instructions can further include instructions for receiving login information for both the first and second users from their respective devices, and evaluating the aggregate data can further include evaluating respective profiles associated with the first and second user to identify the content. Determining that a first one of the co-located devices is configured to be viewed by multiple people can include determining a screen size associated with the first one of the co-located devices and determining that the screen size is above a threshold size. Gathering use data can include gathering data for only as long as the first and second devices are co-located.

In general, another innovative aspect of the subject matter described in this specification can be implemented in systems, including a system comprising one or more processors and one or more memory elements including instructions. The instructions, when executed, cause the one or more processors to: identify a set of co-located devices including at least a first device and a second device that are associated with different users and are currently in proximity to each other; determine that a first one of the co-located devices is configured to be viewed by multiple people; gather use data associated with current sessions associated with the different users related to their use of their respective devices including gathering first data related to the use of the first device by a first user and second data related to the use of the second device by a second different user for their current sessions; aggregate, using one or more processors, the first and second data to create aggregate data related to use of both the first and second devices by their respective users; and evaluate the aggregate data including using the aggregate data to identify content to present on the first one of the co-located devices for presentation to both the first and the second user.

These and other implementations can each optionally include one or more of the following features. Identifying a set of co-located devices can include receiving location information for both the first and second device, evaluating the received location information to determine a relative distance between the first and second devices, and comparing the relative distance to a threshold. The instructions can further include instructions for receiving login information for both the first and second users from their respective devices, and evaluating the aggregate data can further include evaluating respective profiles associated with the first and second user to identify the content. Determining that a first one of the co-located devices is configured to be viewed by multiple people can include determining a screen size associated with the first one of the co-located devices and determining that the screen size is above a threshold size. Gathering use data can include gathering data for only as long as the first and second devices are co-located.

Particular implementations may realize none, one or more of the following advantages. A content item can be presented to a co-located user device (e.g., a networked television) having enhanced presentation characteristics rather than, or in addition to, presenting the content item on a user device having limited display capabilities, for example, having a small screen (e.g., smartphone).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process for selecting content based on aggregated use data associated with users of co-located devices.

Like reference numbers and designations in the various drawings indicate like elements.

DETAILED DESCRIPTION

Figure 1:
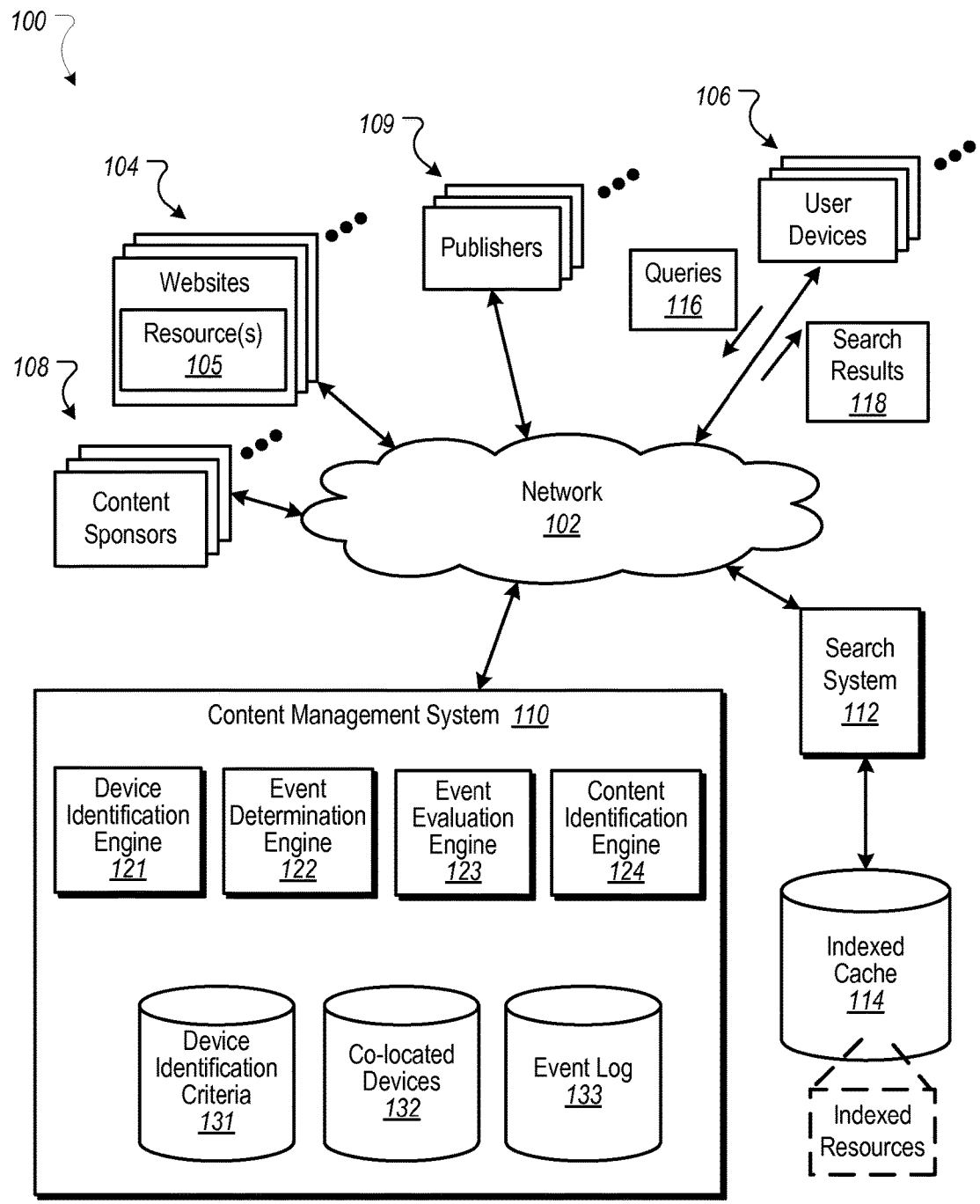
FIG. 1 is a block diagram of an example environment for delivering content.

Systems, methods, computer program products and mechanisms are described for providing content to co-located devices. For example, content can be provided to a first device that is related to or selected based on an event associated with content selected or presented at a second device. Selection of content in this way can allow for content to be presented, for example, at a user device having a large screen (or other enhanced presentation characteristics) and that may be likely to be experienced by multiple users.

For example, a first device can be identified that is associated with a first user. A second different device, associated with a second different user, can be determined that is in proximity to the first device. A first group can be defined that includes both devices. Other devices in proximity to the first device can also be identified and added to the first group. An occurrence of an event can be determined in association with the second different device. The event can be determined, for example, from an indication of a user interaction with the second different device, such as a search request, a request for specific content, a selection of content, navigation to a resource, an action in a social network, or some other user interaction. The event can be evaluated to determine when the event is indicative of a follow-on opportunity for presentation of content to the first user on the first device. For example, the follow-on opportunity can be an opportunity to present further content to a user, the selection of the content being related to, or in association with, the event. Information related to the event can be stored, e.g., as a record in a log, in association with an identifier for the first group. Subsequent to storing the event information, a first opportunity can be identified to provide content to the first device, such as in response to a request for content or for other reasons. The first opportunity can be evaluated, including locating the record associated with the event, and information from the record can be used when selecting content for delivery in response to the first opportunity. For example, the content that is selected can be an advertisement that is selected for presentation on the first device based on the event that occurred in association with the second different device.

In some implementations, content identified for presentation to a co-located device can be selected, at least in part, based on aggregated use data associated with users of co-located devices. For example, a set of co-located devices can be identified, including at least a first device and a second device that are associated with different users and are currently in proximity to each other. A determination can be made that a first one of the co-located devices is configured to be viewed by multiple people. Use data can be gathered that is associated with current sessions associated with the different users related to their use of their respective devices. Gathering the use data can include gathering first data related to the use of the first device by a first user and second data related to the use of the second device by a second different user for their current sessions. The first and second data can be aggregated to create aggregate data related to use of both the first and second devices by their respective users. The aggregate data can be evaluated, including using the aggregate data to identify content (e.g., advertisements) to present on the first one of the co-located devices for presentation to both the first and the second user. Other ways are possible for selecting content to present to one or more co-located devices.

In some implementations, determining co-located devices can be limited to user devices that are associated with the same user. For example, the user's smartphone can be determined to be in proximity to the user's networked television, e.g., that may be in the viewable and/or audible range of other users in addition to the user. In some implementations, other users' devices can be included in determining co-located devices. In some implementations, content (e.g., advertisements, videos, etc.) can be selected or recommended based on a collective watch history of a group of users, and can be further based on content being currently provided.

For situations in which the systems discussed here collect and/or use information including personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some implementations, users can specify whether or not to allow their devices to be used for determining co-located devices. For example, users can specify that their devices are not authorized to determine co-located devices or provide data for a determination of co-location.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. A data store of device identification criteria 131, for example, can include criteria used to identify devices and to determine whether devices are co-located and or should qualify for follow up content. For example, the criteria can include device characteristics, e.g., that identify a minimum screen size for which devices should be identified for receipt of content in follow-on opportunities. A data store of co-located devices 132, for example, can include information that identifies user devices that are co-located, e.g., in proximity to each other, to be used to present content to other devices in the group when a follow-on opportunity is determined. An event log 133, for example, can include information for events that have occurred at particular user devices, e.g., in a time-annotated queue of events that can be used to select content for follow-on opportunities.

The content management system 110 can include plural engines, some or all of which may be separate or combined, and may be co-located or distributed (e.g., connected over the network 102). A device identification engine 121, for example, can identify user devices that are co-located and to which content is to be provided. For example, user devices 106 that are in the same area (e.g., the same room) can be identified as being co-located because they share the same, or essentially the same, GPS coordinates. Other ways of identifying co-located user devices can be used, e.g., near-field communication (NFC), a shared WiFi network or location, or other device co-location determination techniques. The device identification engine 121 can also form a group that includes devices that are determined to be co-located (e.g., in proximity).

An event determination engine 122, for example, can determine an occurrence of an event in association with a device. For example, the event can be an occurrence of a presentation of content to a user associated with one of the group of co-located devices.

An event evaluation engine 123, for example, can evaluate an event to determine when the event is indicative of a follow-on opportunity for presentation of content to a user. The follow-on opportunity, for example, can be an opportunity to present further content to a user related to, or in association with, the event. The event evaluation engine 123 can store information related to the event in the event log 133, e.g., in association with an identifier for the group.

A content identification engine 124, for example, can identify content items (e.g., advertisements) that are responsive to received requests for content. Identifying the content items can include, for example, the use of keywords to identify eligible content items, as described above. Content items can also be selected based on their likely performance in situations in which content is selected for co-located devices, e.g., for providing content items for follow-on opportunities.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
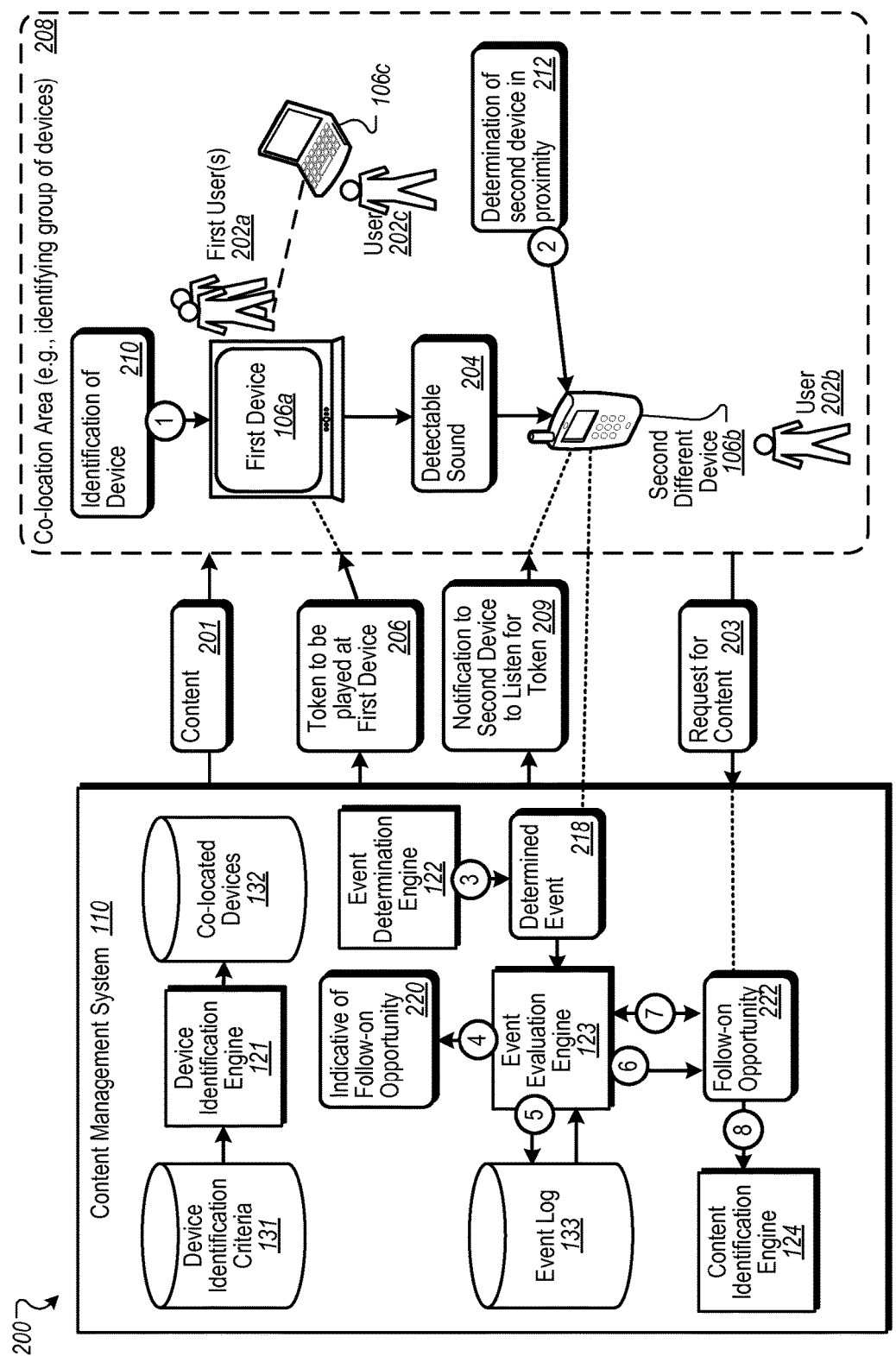
FIG. 2 shows an example system for providing content.

FIG. 2 shows an example system 200 for providing content. The content that is provided can be selected based, at least in part, on events (e.g., associated with users) that occur at one or more co-located devices. For example, the content management system 110 can use information associated with an event occurring at a second different device 106b to identify an opportunity to provide content 201 to a co-located first device 106a. The opportunity can be identified, for example, at a time that the content management system 110 receives a request for content 203 from the first device 106a. The content management system 110 can determine, for example, if an opportunity presents itself to reach a larger audience by providing content to a nearby device that is enabled to present information to more people (e.g., based on screen size). For example, the second co-located device 106b (e.g., a smartphone, a wearable, etc.) may be likely to be used by a single user 202b, and the first device 106a may be a device (e.g., having a large screen) that is likely to be experienced by one or more first users 202a.

In some implementations, before making a decision to provide content 201 on the first device 106a, the content management system 110 can determine if speakers on the first device 106a are enabled (e.g., non-muted). In some implementations, determining the speaker status of the first device 106a can be accomplished by having the first device 106a emit detectable sound 204, e.g., including a token 206 provided by the content management system 110. In some implementations, the sound can be of the form of a token or other snippet of sound that may be inaudible to humans. The token, for example, can be included in an audio stream that includes both conventional sound (i.e., sound that is associated with a given program presented on the first device 106a) and the token. In some implementations, multiple speaker tests can occur initially and/or periodically to determine the status of speakers of multiple devices 106 within a co-location area 208 that includes the second different device 106b and one or more first devices 106a. Example first devices 106a and second different devices 106b include a mobile telephone, a mobile electronic device with a microphone, a desktop computer, or another electronic device with a microphone. In some implementations, the following example sequence of stages can be used to provide content based on co-located devices.

At stage 1, for example, the device identification engine 121 can identify (210) the first device 106a that is associated with the first user 202a. The identification can be made, for example, because the first device 106a is currently receiving (or has recently received) content (e.g., resources, videos, advertisements, etc.) from the content management system 110. Identification of a particular device can include, for example, identification of characteristics of the device, such as a screen size or other characteristics that can be indicative of the quality of a content presentation opportunity to multiple users. For example, the first device 106a can be a large-screen television that is networked to the Internet and under control the first user 202a.

At stage 2, for example, the device identification engine 121 can determine (212) that the second different device 106b is in proximity to the first device 106a. The device identification engine 121 can form a first group that includes the first device 106a and the second different device 106b, e.g., that is associated with the second different user 202b. The group can also include other user devices 106 in proximity to the first device 106a, such as a third device 106c. In some implementations, the first device 106a can be a presentation device being controlled by the third device 106c that can also be associated with the first user 202a. Identification of the second different device 106b can be made based, at least in part, on determining that the second different device 106b is in proximity to the first device 106a, e.g., within the co-location area 208. The co-location area 208 can include devices, for example, that are identified (e.g., using GPS) as being within an audible range of the second co-located device 106b. In some implementations, information that identifies co-located devices and their associated groups can be stored in the data store of co-located device 132.

In some implementations, determining co-located devices can be based on speaker ranges of one or more first device(s) 106a and microphone capabilities of the second co-located device 106b, e.g., relative to hearing detectable sounds. The content management system 110, for example, can identify and provide a token 206 that is to be played on the first device 106a. The content management system 110 can also provide a notification 209 to the second different device 106b that instructs the device to listen for the token 206 emitted by the first device 106a. The notification 209 can be provided, for example, at a time just before the token 206 is provided to the first device 106a, or slightly thereafter. The token 206 can be, for example, a small snippet of inaudible (e.g., inaudible to humans) sound that can be inserted into audio content that is to be played on the first device 106a. For example, the token 206 can be inserted into the audio of a video that is being provided to the first device 106a for presentation. Other ways of presenting the token 206 are possible. Using the received token 206, the first device 106a can emit the detectable sound 204, e.g., that includes the token 206. The second different device 106b, for example, can listen for and/or record the detectable sound 204, including listening for and identifying the token 206. In some implementations, other devices 106 in addition to the second different device 106b and in proximity to the first device 106a can also listen for the detectable sound 204.

In some implementations, plural first devices 106a may be in proximity to the second co-located device 106b, affording an opportunity to listen for and identify each of the respective first devices. In some implementations, plural second co-located devices 106b may be in proximity to a first device 106a, enabling each of the plurality of devices to confirm the existence or absence of a presented token.

At stage 3, for example, the event determination engine 122 can determine an occurrence of an event 218 (or multiple events 218) in association with the second different device 106b. For example, the event can be an occurrence of a presentation of content to the second different user 202b. Other example events can include entering a search query by the user 202b, receiving indication of, or providing content to, the user 202b such as a video or an advertisement, receiving an indication of the user 202b visiting a specific web site, receiving an indication of a calendar item for the user 202b firing that is related to particular content, or some other event.

At stage 4, for example, the event evaluation engine 123 can evaluate the event 218 to determine when the event 218 is indicative (220) of a follow-on opportunity for presentation of content to the first user 202a on the first device 106a. For example, not all events identified at stage 3 are events for which a follow-on opportunity may be indicated. The follow-on opportunity, for example, can be an opportunity to present, to the user, further content that is related to, or in association with, the event. For example, if the event is the presentation of a particular video to the user, then the follow-on opportunity to present content can be an opportunity to present a content item (e.g., an advertisement) that is related to the video. In some implementations, factors that can be used to determine when a follow-on opportunity exists include, for example, whether the follow-on opportunity would complement or be related to the event 218 in some way, whether group presentation can provide a likely benefit from social conversation, whether a brand-related presentation is possible and likely to provide a significant effect (e.g., user interaction), whether presentation of follow-on content can serve as an organic endorsement of content, whether the number of potential viewers of the follow-on content is worth presentation of the content, and whether a delayed or immediate presentation is likely to provide the greatest benefit.

At stage 5, for example, the event evaluation engine 123 can store, as a record in the event log 133, the information related to the event 218 in association with an identifier for the group. For example, the event log 133 can include, for any given second different device 106b, information that identifies the type of event and when the event occurred.

At stage 6, for example, subsequent to storing information related to the event, the event evaluation engine 123 can identify a follow-on opportunity 222 to provide content to the first device 106a. For example, the follow-on opportunity 222 can be identified from a request for content 203 that is received from the first device 106a (or some other device in the same group).

At stage 7, for example, the event evaluation engine 123 can evaluate the follow-on opportunity 222. The evaluation can include, for example, locating one or more records in the event log 133, e.g., to find queued-up events associated with the group to which the first device 106a belongs. In some implementations, evaluating the follow-on opportunity 222 can include evaluating multiple event records in the event log 133. In some implementations, queued-up events can be located to identify follow-on opportunities for presentation of content to individual users, even if the individual users are no longer part of the group.

At stage 8, for example, the content identification engine 124 can use information in the one or more event records in the event log 133 to select content for delivery in response to the first opportunity. As an example, the content identification engine 124 can identify one or more eligible content items (e.g., video advertisements associated with product X) for the first device 106a using associated event information for events that occurred relative to the second different device 106b.

Figure 3A:
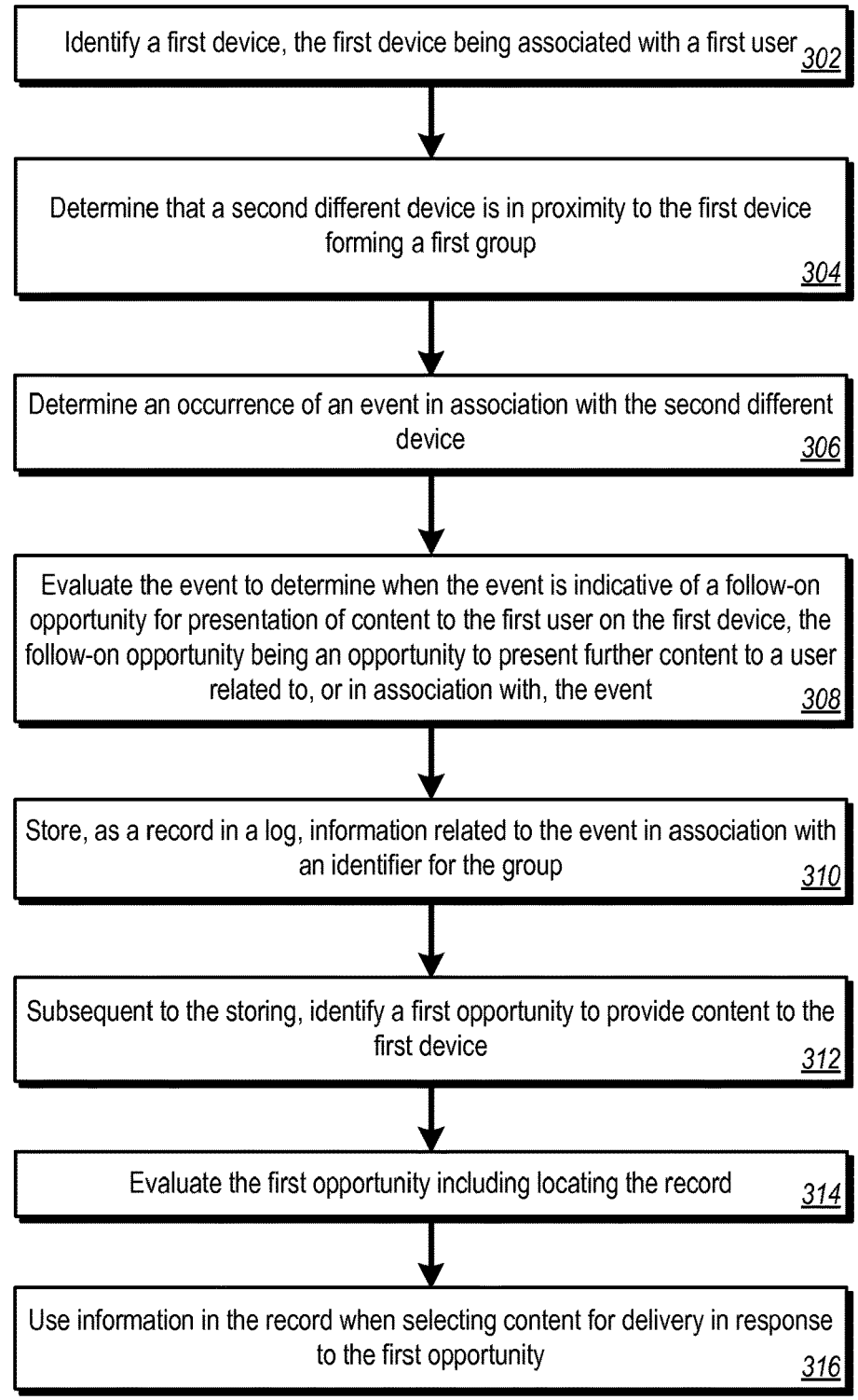
FIG. 3A is a flowchart of an example process for selecting content for presentation on collocated devices.

FIG. 3A is a flowchart of an example process 300 for selecting content for presentation on co-located devices. In some implementations, the content management system 110 can perform stages of the process 300 using instructions that are executed by one or more processors. FIGS. 1-2 are used to provide example structures for performing the steps of the process 300.

A first device is identified that is associated with a first user (302). As an example, the device identification engine 121 can identify (210) the first device 106a for presenting content to the one or more users 202a. In some implementations, the identification can be made because the first device 106a is currently receiving (or has recently received) content (e.g., resources, videos, advertisements, etc.) from the content management system 110.

A determination is made that a second different device is in proximity to the first device, forming a first group, the second different device being associated with a second different user (304). The device identification engine 121, for example, can determine (212) the second co-located device 106b, e.g., based on a determination that the second co-located device 106b is in proximity to the first device 106a (e.g., within the co-location area 208). The co-location area 208 can include devices, for example, that are identified (e.g., using GPS) as being within an audible range of the second co-located device 106b. For example, the range can be based on speaker ranges of one or more first device(s) 106a and microphone capabilities of the second co-located device 106b, e.g., relative to hearing inaudible sounds. Determining that the second co-located device 106b is in proximity to the first device 106a, for example, can include the use of GPS, near-field communication (NFC), a shared WiFi network or location, or other techniques that indicate that devices are in the same area (e.g., in the same room or within audible and/or viewable range).

In some implementations, determining that a second different device is in proximity to the first device can further include detecting, by one of the first device or the second different device, a presence of another device based on sub, super or audible tones generated by the other device. For example, the second different device 106b can listen for the detectable sound 204 after receiving a notification 209 from the content management system 110. Further, any of the devices in the group can listen for sounds emitted from other devices in the group.

In some implementations, the process 300 can further include determining plural second different devices that are in proximity to the first device, each associated with a different user, and including the plural second different devices in the group. For example, the device identification engine 121, for example, can identify the third device 106c associated with a user 202c, as well as other devices associated with other users.

A determination is made of an occurrence of an event in association with the second different device (306). As an example, the event determination engine 122 can determine an occurrence of an event 218 (or multiple events 218) in association with the second different device 106b, e.g., an occurrence of a presentation of content to the second different user 202b. Other example events 218 can include a search query entered by the user 202b, an advertisement provided to the second different device 106b, a presentation of a particular video to the user 202b, the user 202b visiting a specific web site, the user 202b being provided a particular content item, a calendar item firing that can be related to particular content, or some other event.

In some implementations, the event can be an occurrence of a presentation of content to the second different user. For example, the event 218 identified by the event determination engine 122 can be based on information that a particular advertisement or a particular video has been presented (e.g., to the user 202b) on the second different device 106b.

In some implementations, the process 300 can further include determining an occurrence of an event on one or more of the plural second different devices and evaluating and storing information related to each determined event. For example, the event determination engine 122 can determine that one or more events 218 have occurred in association with one or more other devices in addition to or other than the second different device 106b.

In some implementations, determining an occurrence of an event can include receiving an indication of a user interaction with the second different device. For example, the event 218 determined by the event determination engine 122 can be a user interaction, by the user 202b, such as a search request, a request for specific content, a selection of content, navigation to a resource, an action in a social network, or some other user interaction on which to base an opportunity to provide content to a user device in proximity to other user devices in the group.

The event is evaluated to determine when the event is indicative of a follow-on opportunity for presentation of content to the first user on the first device, the follow-on opportunity being an opportunity to present further content to a user related to, or in association with, the event (308). As an example, the event evaluation engine 123 can evaluate the event 218 to determine when the event 218 is indicative (220) of a follow-on opportunity for presentation of content to the first user 202a on the first device 106a, as described above.

In some implementations, evaluating can include determining a type of event and determining, based on the type of event, a likelihood that a follow-on opportunity is appropriate. For example, based on the type of the event 218 (e.g., a search request, a request for specific content, a selection of content, a navigation to a resource, an action in a social network), the event evaluation engine 123 determine whether a follow-on opportunity is warranted, such as to provide a related content item on the co-located device 106a.

Information related to the event is stored as a record in a log in association with an identifier for the group (310). The event evaluation engine 123, for example, can store a record in the event log 133 that includes information related to the event 218. As an example, the information can be stored in the event log 133 in association with an identifier for the group that includes the first device 106a and the second different device 106b.

In some implementations, the log can be a queue, with entries being logged based on a time of occurrence of the event. For example, records in the event log 133 that are associated with a particular group can be a time-annotated and stored as a queue, such as a search request occurring at time X, a request for specific content occurring at time Y, a selection of content occurring at time Z, and/or other queue entries.

In some implementations, the information can include one or more keywords associated with the event. For example, if the event 218 is a selection of content, then information stored for the event 218 in the event log 133 can include the keywords used in selecting the content.

Subsequent to the storing, a first opportunity to provide content to the first device is identified (312). For example, the event evaluation engine 123 can identify the follow-on opportunity 222 to provide content to the first device 106*a*, e.g., when the request for content 203 is received from the first device 106*a*.

In some implementations, the first opportunity can be substantially immediately after an occurrence of the event. For example, receipt of the request for content 203 can occur after the determined event 218 occurs, e.g., a search request, a request for specific content, a selection of content, navigation to a resource, an action in a social network, or some other user interaction that occurs on the second different device 106*b*.

The first opportunity is evaluated including locating the record (314). As an example, the event evaluation engine 123 can evaluate the follow-on opportunity 222, including locating one or more queued-up event records in the event log 133 that are associated with the group to which the first device 106*a* belongs.

In some implementations, evaluating the first opportunity can include identifying the record in the log and determining a time for presentation of content to the first user including determining a suitability to present content substantially immediately or after a delay after the occurrence of the event. For example, the event evaluation engine 123 can use information in an event record in the event log 133 to determine that the follow-on opportunity 222 should result in a presentation of related content at a particular time that is relative to (e.g., ten minutes after) the occurrence of the event.

In some implementations, evaluating the first opportunity can include evaluating one or more criteria associated with the first device to determine suitability of the first device to present specialized content, and wherein using information in the record includes identifying specialized content for presentation of the first device when the first device satisfies the one or more criteria. For example, the event evaluation engine 123 can base a decision to provide content to the first device 106*a* on whether the first device 106*a* has a suitable screen size for receiving particular content (e.g., a video advertisement).

The information in the record is used when selecting content for delivery in response to the first opportunity (316). The content identification engine 124, for example, can select content 201 to be provided in response to the request for content 203 that is received from the first device 106*a*.

In some implementations, using the information can include using the information to select candidate items from inventory for further evaluation responsive to the first opportunity. For example, the content identification engine 124 can select content 201 using information in the event record(s) to provide content to a co-located device (e.g., the first device 106*a*).

In some implementations, using the information can include using the information to select a content item from the candidate content items for presentation to the first user based. For example, the content identification engine 124 can select content 201 using information in the event records, e.g., keywords or other information identified from the determined event 218.

In some implementations, using the information can include using the information to adjust bids in an auction to select, from among candidate content items, a content item to present to the first device in response to the first opportunity. As an example, the content identification engine 124 can use information in the event record(s) to determine an adjustment to a quality score used in an auction for selecting content. For example, the content management system 110 can increase the quality score for a content item (e.g., advertisement) that will likely be experienced on a device (e.g., the first device 106*a*) that may be viewed by multiple users 202*a*. In some implementations, an increased quality score for a content item can increase a bid, in an auction, for presentation of the content item.

FIG. 3B is a flowchart of an example process 320 for selecting content based on aggregated use data associated with users of co-located devices. For example, media contents can be identified for a user in a recommendation system or an ad serving system based on determining devices in proximity and shared viewing experiences. In some implementations, co-engagement cluster analysis (e.g., for devices/users in proximity) can be used in order to identify which content (e.g., ad(s) or suggestions such as, video recommendations) to select or show. In some implementations, the content management system 110 can perform stages of the process 320 using instructions that are executed by one or more processors. FIGS. 1-2 are used to provide example structures for performing the steps of the process 320.

A set of co-located devices is identified including at least a first device and a second different device that are associated with different users and are currently in proximity to each other (322). For example, the device identification engine 121 can identify the first device 106*a* that is associated with the first user 202*a* and the second different device 106*b* that is associated with the second different user 202*b*. In some implementations, determining that devices are co-located can include the use of GPS, near-field communication (NFC), a shared WiFi network or location, or other technique(s) that indicate that devices are in the same area.

In some implementations, identifying a set of co-located devices can include receiving location information for both the first and second device, evaluating the received location information to determine a relative distance between the first and second devices, and comparing the relative distance to a threshold. For example, the device identification engine 121 can use GPS coordinates or other geographic location information for the devices, e.g., to determine that the devices are co-located if they are within 20 feet of each other.

A determination is made that a first one of the co-located devices is configured to be viewed by multiple people (324). The device identification engine 121, for example, can identify, for either of the first device 106*a* or the second different device 106*b*, characteristics of the device. The characteristics can include, for example, a screen size or other characteristics that can indicate that the device is configured for content presentation opportunity to multiple users. For example, the first device 106*a* can be a large-screen television that is networked to the Internet and under control the first user 202*a*.

In some implementations, determining that a first one of the co-located devices is configured to be viewed by multiple people can include determining a screen size associated with the first one of the co-located devices and determining that the screen size is above a threshold size. For example, the device identification engine 121 can determine that one of the devices 106a or 106b has a screen size that exceeds a threshold (e.g., N inches), e.g., as identified in the data store of device identification criteria 131. For example, the criteria can include device characteristics, e.g., that identify a minimum screen size for which co-located devices are be identified for receipt of content. Other ways for determining that a device is viewable by multiple people are possible. For example, instead of analyzing screen sizes of devices, the resolution of a display area on a device can be used.

Use data is gathered that is associated with current sessions associated with the different users related to their use of their respective devices, including gathering first data related to the use of the first device by a first user and second data related to the use of the second different device by a second different user for their current sessions (326). For example, the content management system 110 can identify, gather and store use data such as a user's video watching history, web site visitation history, and other use data on a per-user basis. Histories that are used for use data, for example, can be limited to substantially recent histories.

In some implementations, gathering use data can include gathering data for only as long as the first and second devices are co-located. For example, the use data gathered by the content management system 110 can be limited to a time period that includes only the time that the first device 106a and the second different device 106b are co-located.

The first and second data are aggregated to create aggregate data related to use of both the first and second different devices by their respective users (328). For example, the content management system 110 can combine the use data for the first user 202a and the second user 202b, e.g., to group common uses, such as specific video watching histories or other uses. In some implementations, the aggregated data can be weighted, e.g., based on a level of intersection between users, and ranked, e.g., based on weights.

In some implementations, the process 320 can further include storing the aggregate data for use in selecting content only as long are the first and second device are co-located. For example, the content management system 110 can store the aggregated data only as long as needed, or as long as the first device 106a and second different device 106b are co-located.

The aggregate data is evaluated including using the aggregate data to identify content to present on the first one of the co-located devices for presentation to one or both the first and the second user (330). For example, the content identification engine 124 can analyze the aggregated data, including, for example, using any existing ranking for use in selecting content.

In some implementations, the process 320 can further include using the aggregate data to select content for presentation on other ones of the co-located devices. For example, the content identification engine 124 can select content (e.g., advertisements), make suggestions (e.g., video suggestions) or perform other content-related actions by evaluating the aggregated data (e.g., and using the ranking) for content to present to either or both of the devices 106a and 106b or other devices in the group.

In some implementations, the process 320 can further include receiving login information for both the first and second users from their respective devices, and evaluating the aggregate data can further include evaluating respective profiles (based on the received login data) associated with the first and second user to identify the content. As an example, the content identification engine 124 can access and analyze profile information for the users 202a and 202b for use in selecting content. In some implementations, the profile information can be obtained from profiles available for the users 202a and 202b as a result of user logins through a login service or in other ways.

In some implementations, the process 320 can further include identifying filters to be associated with the aggregate data based on one or more characteristics associated with the first and second different users, and filtering content selections based on the identified filters prior to presentation on the first one of the co-located devices. For example, the content that is selected by the content identification engine 134 can be limited to content that is filtered based on the appropriateness of the content (e.g., not to racy), the number of users likely to see the content, the number of users having use data associated in some way with the content, and or in other ways.

In some implementations, the process 320 can further include receiving, from the first one of the co-located devices, a request for content, and providing a selection for presentation on the first one of the co-located devices based on the evaluating. For example, the content identification engine 124 can provide the content, or suggestions related to the content, to the first device 106a.

In some implementations, the process 320 can further include selecting a first content item based on the aggregate data for display on the first one of the co-located devices, and selecting second different content items for display on other ones of the co-located devices based at least in part on the first content item. The content identification engine 124 can provide one of the selected content items to the first device 106a, and the same or another one of the content items to the second different device 106b.

In some implementations, the process 320 can be used to detect multiple devices and thus multiple (e.g., 2 or greater) user profiles to restrict suggested content (e.g., advertisements or related content) based on the intersection of the different profiles, while taking into account each users' account history. For example, the process 320 can be used to provide or suggest content in the following scenario. User A's profile has the following suggested content after watching video X based on their entire account history: A, B, C, D, H, Q and V. User B's profile has the following suggested content after watching video X based on their entire account history: A, C, H, Q, Y and W. User C's profile has the following suggested content after watching video X based on their entire account history: A, G, Q, R, Y and Z. The process 320 can be used, for example, to detect that all three users are in the same room. Once video X is over, for example, an intersection for suggested content for all 3 users can be {A, Q}. Either A or Q can be presented or suggested next, for example, depending on how they rank.

Figure 4:
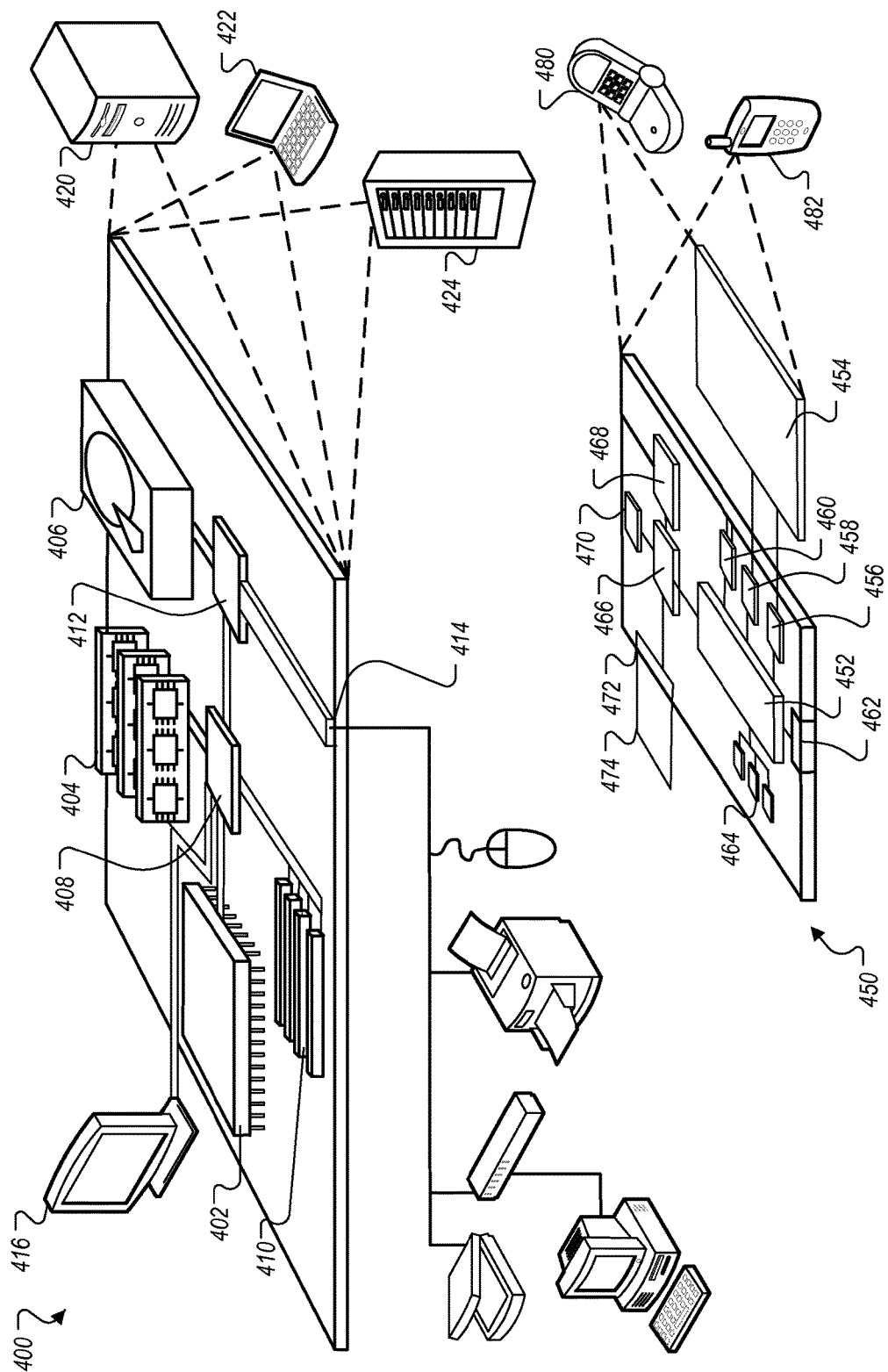
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a set of co-located devices including identifying at least a first device of a first user and a second device of a second user that are both at a particular location, wherein the second device is different than the first device and the second user is different than the first user, and wherein the first user is logged into the first device and the second user is logged into the second device;
determining that the first device controls a shared display device that is different from the first device, wherein the first device presents first content at the shared display device, and wherein the shared display device is configured to be viewed by multiple different people at the particular location;
determining that the second user interacts with second content presented on the second device while the first content is presented on the shared display, wherein the second content is different from the first content;
selecting, for presentation on the shared display by the first device, additional content related to the second content based on the interaction with the second content by the second user, including:
increasing a quality score of the additional content for presentation at the shared display based at least on interaction with the second content at the second device; and
selecting the additional content from a plurality of different content items in a content selection auction based on at least the increased quality score; and
providing the additional content to the first device while the first content is being presented on the shared display, wherein the first device controls the shared display and presents the additional content at the shared display.

2. The method of claim 1 wherein identifying a set of co-located devices includes receiving location information for both the first and second device, evaluating the received location information to determine a relative distance between the first and second devices, and comparing the relative distance to a threshold.

3. The method of claim 1 further comprising:
receiving login information for both the first user and the second user from their respective devices;
gathering use data for current sessions of the first user and the second user based on their use of their respective devices including gathering first data specifying actions performed on the first device by the first user and second data specifying actions performed on the second device by the second user during their current sessions;
aggregating the first and second data to create aggregated multiple-device, current-session use data related to use of both the first and second devices by their respective users, wherein aggregating the first and second data includes evaluating respective profiles associated with the first user and the second different user to select the additional content.

4. The method of claim 1 wherein determining that the first device controls a shared display device that is configured to be viewed by multiple different people includes determining a screen size of the shared display device and determining that the screen size is above a threshold size.

5. The method of claim 3 wherein gathering use data includes gathering data for only as long as the first and second devices are co-located.

6. The method of claim 3 further comprising identifying filters based on one or more characteristics associated with the first and second users, and filtering candidate additional content selections based on the identified filters prior to presentation of the additional content.

7. The method of claim 3 further comprising storing aggregated multiple-device, current-session use data only as long as the first and second device are co-located.

8. The method of claim 3 further comprising using the aggregated multiple-device, current-session use data to select content for presentation on other ones of the co-located devices.

9. The method of claim 3 further comprising selecting the additional content based on the aggregated multiple-device, current-session use data for presentation on the shared display by the first device, and selecting second different additional content for display on other ones of the co-located devices based at least in part on the first content.

10. The method of claim 1, wherein increasing the quality score comprises:
determining a number of potential viewers of a presentation of the additional content at the shared display; and
adjusting the quality score based on at least the number of potential viewers of the presentation of the additional content at the shared display.

11. A computer program product embodied in a non-transitory computer-readable medium including instructions, that when executed, cause one or more processors to:
identify a set of co-located devices including identifying at least a first device of a first user and a second device of a second user that are both at a particular location, wherein the second device is different than the first device and the second user is different than the first user, and wherein the first user is logged into the first device and the second user is logged into the second device;
determine that the first device controls a shared display device that is different from the first device, wherein the first device presents first content at the shared display device, and wherein the shared display device is configured to be viewed by multiple different people at the particular location;
determine that the second user interacts with second content presented on the second device while the first content is presented on the shared display, wherein the second content is different from the first content;
select, for presentation on the shared display by the first device, additional content related to the second content based on the interaction with the second content by the second user, including:
increasing a quality score of the additional content for presentation at the shared display based at least on interaction with the second content at the second device; and
selecting the additional content from a plurality of different content items in a content selection auction based on at least the increased quality score; and
provide the additional content to the first device while the first content is being presented on the shared display, wherein the first device controls the shared display and presents the additional content at the shared display.

12. The computer program product of claim 11 wherein identifying a set of co-located devices includes receiving location information for both the first and second device, evaluating the received location information to determine a relative distance between the first and second devices, and comparing the relative distance to a threshold.

13. The computer program product of claim 11 further comprising:
receiving login information for both the first user and the second user from their respective devices;
gathering use data for current sessions of the first user and the second user based on their use of their respective devices including gathering first data specifying actions performed on the first device by the first user and second data specifying actions performed on the second device by the second user during their current sessions;
aggregating the first and second data to create aggregated multiple-device, current-session use data related to use of both the first and second devices by their respective users, wherein aggregating the first and second data includes evaluating respective profiles associated with the first user and the second different user to select the additional content.

14. The computer program product of claim 11 wherein determining that the first device controls a shared display device that is configured to be viewed by multiple different people includes determining a screen size of the shared display device and determining that the screen size is above a threshold size.

15. The computer program product of claim 13 wherein gathering use data includes gathering data for only as long as the first and second devices are co-located.

16. A system comprising:
one or more processors; and
one or more memory elements including instructions that, when executed, cause the one or more processors to:
identify a set of co-located devices including identifying at least a first device of a first user and a second device of a second user that are both at a particular location, wherein the second device is different than the first device and the second user is different than the first user, and wherein the first user is logged into the first device and the second user is logged into the second device;
determine that the first device controls a shared display device that is different from the first device, wherein the first device presents first content at the shared display device, and wherein the shared display device is configured to be viewed by multiple different people at the particular location;
determine that the second user interacts with second content presented on the second device while the first content is presented on the shared display, wherein the second content is different from the first content;
select, for presentation on the shared display by the first device, additional content related to the second content based on the interaction with the second content by the second user, including:
increasing a quality score of the additional content for presentation at the shared display based at least on interaction with the second content at the second device; and
selecting the additional content from a plurality of different content items in a content selection auction based on at least the increased quality score; and
provide the additional content to the first device while the first content is being presented on the shared display, wherein the first device controls the shared display and presents the additional content at the shared display.

17. The system of claim 16 wherein identifying a set of co-located devices includes receiving location information for both the first and second device, evaluating the received location information to determine a relative distance between the first and second devices, and comparing the relative distance to a threshold.

18. The system of claim 16 further comprising:
receiving login information for both the first user and the second different user from their respective devices;
gathering use data for current sessions of the first user and the second user based on their use of their respective devices including gathering first data specifying actions performed on the first device by the first user and second data specifying actions performed on the second device by the second user during their current sessions;
aggregating the first and second data to create aggregated multiple-device, current-session use data related to use of both the first and second devices by their respective users, wherein aggregating the first and second data includes evaluating respective profiles associated with the first user and the second different user to select the additional content.

19. The system of claim 16 wherein determining that the first device controls a shared display device that is configured to be viewed by multiple different people includes determining a screen size of the shared display and determining that the screen size is above a threshold size.

20. The system of claim 18 wherein gathering use data includes gathering data for only as long as the first and second devices are co-located.

* * * * *

UNITED STATES PATENT AND TRADEMARK OFFICE
CERTIFICATE OF CORRECTION

| | | |
|---|---|---|
| PATENT NO. | : 10,200,454 B1 | Page 1 of 1 |
| APPLICATION NO. | : 14/296344 | |
| DATED | : February 5, 2019 | |
| INVENTOR(S) | : Lewis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this
First Day of September, 2020

Andrei Iancu
*Director of the United States Patent and Trademark Office*